United States Patent
Asano et al.

(10) Patent No.: US 11,409,890 B2
(45) Date of Patent: Aug. 9, 2022

(54) VIDEO RECORDING APPARATUS AND VIDEO RECORDING VERIFICATION SYSTEM, AND VIDEO RECORDING METHOD AND VIDEO VERIFICATION METHOD

(71) Applicant: Panasonic Intellectual Property Management Co., Ltd., Osaka (JP)

(72) Inventors: Taishi Asano, Osaka (JP); Kenji Tachibana, Osaka (JP); Shunsuke Saito, Osaka (JP); Masaharu Hirohata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 175 days.

(21) Appl. No.: 16/683,696

(22) Filed: Nov. 14, 2019

(65) Prior Publication Data
US 2020/0184083 A1 Jun. 11, 2020

Related U.S. Application Data

(63) Continuation of application No. PCT/JP2018/019110, filed on May 17, 2018.
(Continued)

(51) Int. Cl.
*G06F 21/60* (2013.01)
*G06F 21/10* (2013.01)
*G06F 21/64* (2013.01)

(52) U.S. Cl.
CPC ............ *G06F 21/602* (2013.01); *G06F 21/10* (2013.01); *G06F 21/64* (2013.01); *G06F 2221/2151* (2013.01)

(58) Field of Classification Search
CPC ........ G06F 21/602; G06F 21/10; G06F 21/64; G06F 2221/2151; H04N 1/32; H04N 5/232; H04N 5/765; G03B 17/24
See application file for complete search history.

(56) References Cited

U.S. PATENT DOCUMENTS 7,003,114 B1 * 2/2006 Mauro .................... H04K 1/00
380/261
10,506,206 B2 * 12/2019 Orlick ............... G03B 21/2053
(Continued)

FOREIGN PATENT DOCUMENTS

EP 2 503 852 9/2012
EP 2503852 A1 * 9/2012 ........... H04B 10/116
JP 2006-345450 12/2006

OTHER PUBLICATIONS

Extended European Search Report dated Apr. 29, 2020 in corresponding European Patent Application No. 18802997.9.
(Continued)

*Primary Examiner* — Abiy Getachew
(74) *Attorney, Agent, or Firm* — Wenderoth, Lind & Ponack, L.L.P.

(57) ABSTRACT

A video recording apparatus includes an illumination apparatus applying a modulated illumination light, a control apparatus controlling the illumination apparatus, an imaging apparatus imaging the illumination light and an object at the same time to generate video data; and a storage apparatus storing the video data generated by the imaging apparatus. The control apparatus generates encrypted data by using at least a portion of the video data imaged by the imaging apparatus and encryption information generated as information changing in accordance with a date and time and used for encryption and controls the illumination apparatus such that the illumination light is modulated by the generated encrypted data.

6 Claims, 12 Drawing Sheets

Related U.S. Application Data

(60) Provisional application No. 62/507,404, filed on May 17, 2017.

(56) References Cited

U.S. PATENT DOCUMENTS

| | | | | |
|---|---|---|---|---|
| 2015/0116541 A1* | 4/2015 | Gilman | .............. | H04N 1/32101 |
| | | | | 348/231.5 |
| 2015/0222843 A1* | 8/2015 | Avrahami | .......... | H04N 21/4307 |
| | | | | 386/219 |
| 2017/0124421 A1* | 5/2017 | Van Eeuwijk | ..... | H04N 1/32128 |
| 2018/0314182 A1* | 11/2018 | Wada | ................... | G03G 15/043 |
| 2019/0044723 A1* | 2/2019 | Prakash | ................ | H04L 9/3234 |
| 2020/0184083 A1* | 6/2020 | Asano | .................. | G06F 21/602 |

OTHER PUBLICATIONS

English translation of the International Preliminary Report on Patentability dated Nov. 28, 2019 in International (PCT) Application No. PCT/JP2018/019110.

International Search Report dated Jul. 31, 2018 in International (PCT) Application No. PCT/JP2018/019110.

Notice of Reasons for Refusal dated Apr. 4, 2022 in Japanese Patent Application No. 2019-518863.

* cited by examiner

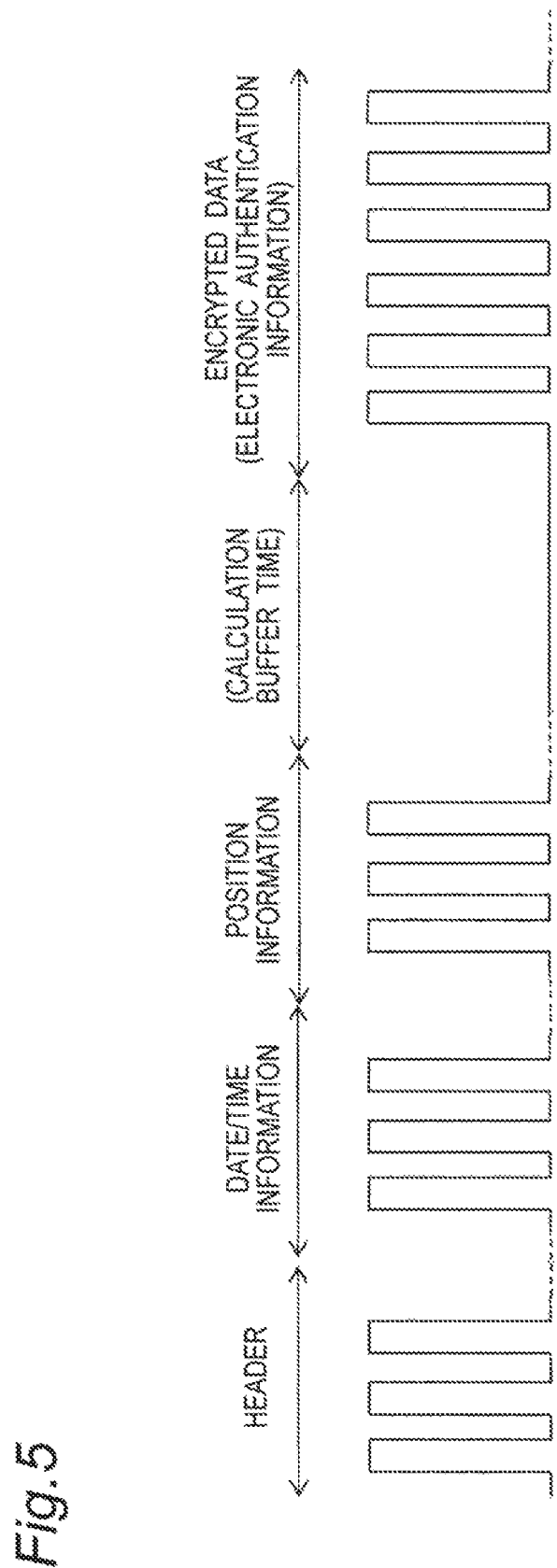

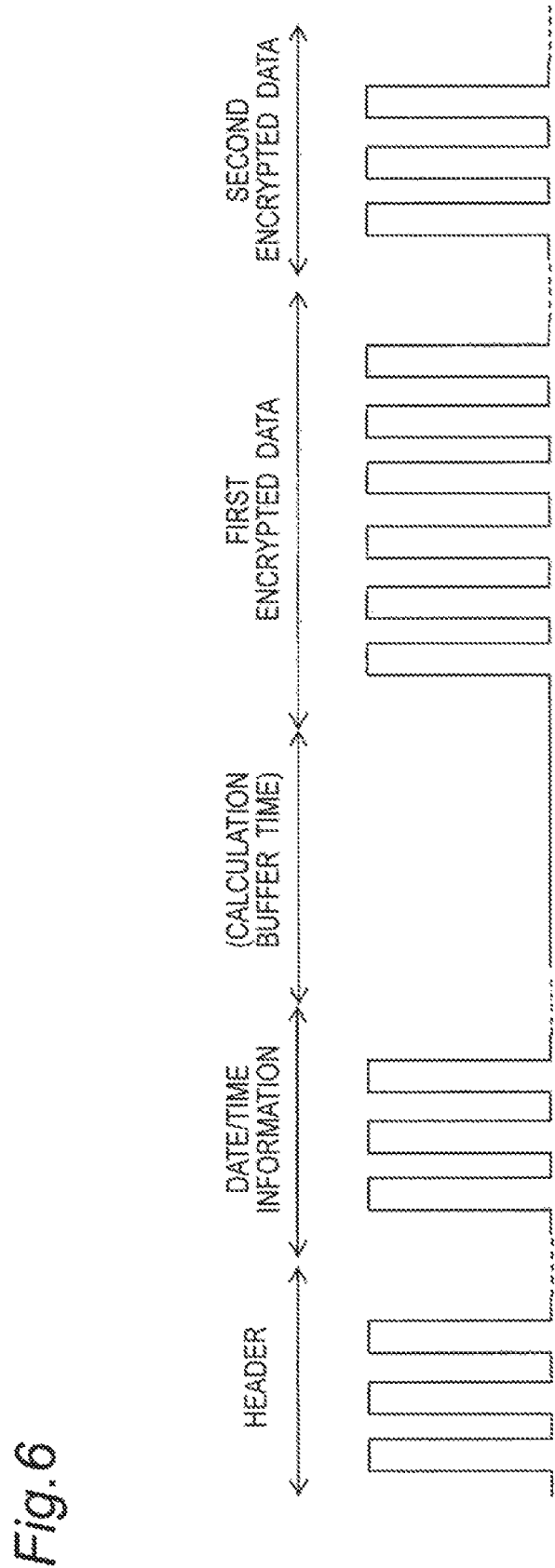

VIDEO RECORDING APPARATUS AND VIDEO RECORDING VERIFICATION SYSTEM, AND VIDEO RECORDING METHOD AND VIDEO VERIFICATION METHOD

CROSS-REFERENCE TO RELATED APPLICATIONS

This is a continuation application of International Application No. PCT/JP2018/019110, with an international filing date of May 17, 2018, which claims priority of U.S. Provisional Application No. 62/507,404 filed on May 17, 2017, the content of which is incorporated herein by reference.

BACKGROUND

1. Technical Field

The present disclosure relates to a video recording apparatus recording video data so that whether a recorded video is falsified can be verified, and a system verifying whether falsification is made.

2. Related Art

Since video recording devices and networks are improved in performance and reduced in price, a large amount of video data can be acquired. Accurately recording when and where a video is acquired is becoming a challenge for effectively utilizing a large amount of data.

JP 2006-345450 A discloses an image verification system including an imaging apparatus applying a falsification prevention process to an image file including a taken image and associated information thereof, and an image verification apparatus verifying that the image file is not falsified. The imaging apparatus includes user-interface providing means providing a user interface for allowing a user to select an item to be subjected to the falsification prevention process out of the associated information, encrypting means creating encryption associated information obtained by encrypting the associated information selected with the user interface, and adding means adding the encryption associated information to the image file to create an additional image file. The image verification apparatus includes decrypting means decrypting the encryption associated information to create decryption associated information, and collating means collating each item of the decryption associated information with each corresponding item of the associated information.

According to the image verification system of JP 2006-345450 A, an item to be prevented from being falsified is specified out of associated information of an image file depending on the use of the image file, and if the image file is partially changed, a changed portion can be detected distinctively from an unchanged portion.

SUMMARY

A conventional electronic certificate granting system as described in JP 2006-345450 A certifies that no falsification is made after an electronic certificate is granted, rather than certifying that no falsification is made from the time of generation of a video. For example, when a portion of video data obtained by photographing is edited to create a new electronic file, a new electronic certificate may be granted to the new electronic file, and falsification during video editing cannot be prevented.

The present disclosure provides a video recording and verification system capable of certifying that no falsification is made from the time of generation of video data.

A first aspect of the present disclosure provides a video recording apparatus. The video recording apparatus includes an illumination apparatus applying a modulated illumination light; a control apparatus controlling the illumination apparatus; an imaging apparatus imaging the illumination light and an object at the same time to generate video data; and a storage apparatus storing the video data generated by the imaging apparatus. The control apparatus generates encrypted data by using at least a portion of the video data imaged by the imaging apparatus and encryption information generated as information changing in accordance with a date and time and used for encryption and controls the illumination apparatus such that the illumination light is modulated by the generated encrypted data.

According to the present disclosure, since the electronic authentication information can be embedded in the video at the time of generation of the video data, it can be certified that no falsification is made from the time of generation of the video data.

BRIEF DESCRIPTION OF DRAWINGS

FIG. 5 is a diagram showing an example of information embedded in illumination light.

FIG. 6 is a diagram showing another example of information embedded in illumination light.

DETAILED DESCRIPTION

Embodiments will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art. The accompanying drawings and the following description are provided by the present inventor(s) for sufficient understanding of the present disclosure by those skilled in the art, and it is not intended to limit the subject matter described in claims thereto.

First Embodiment

[1-1. Configuration]

Figure 1:
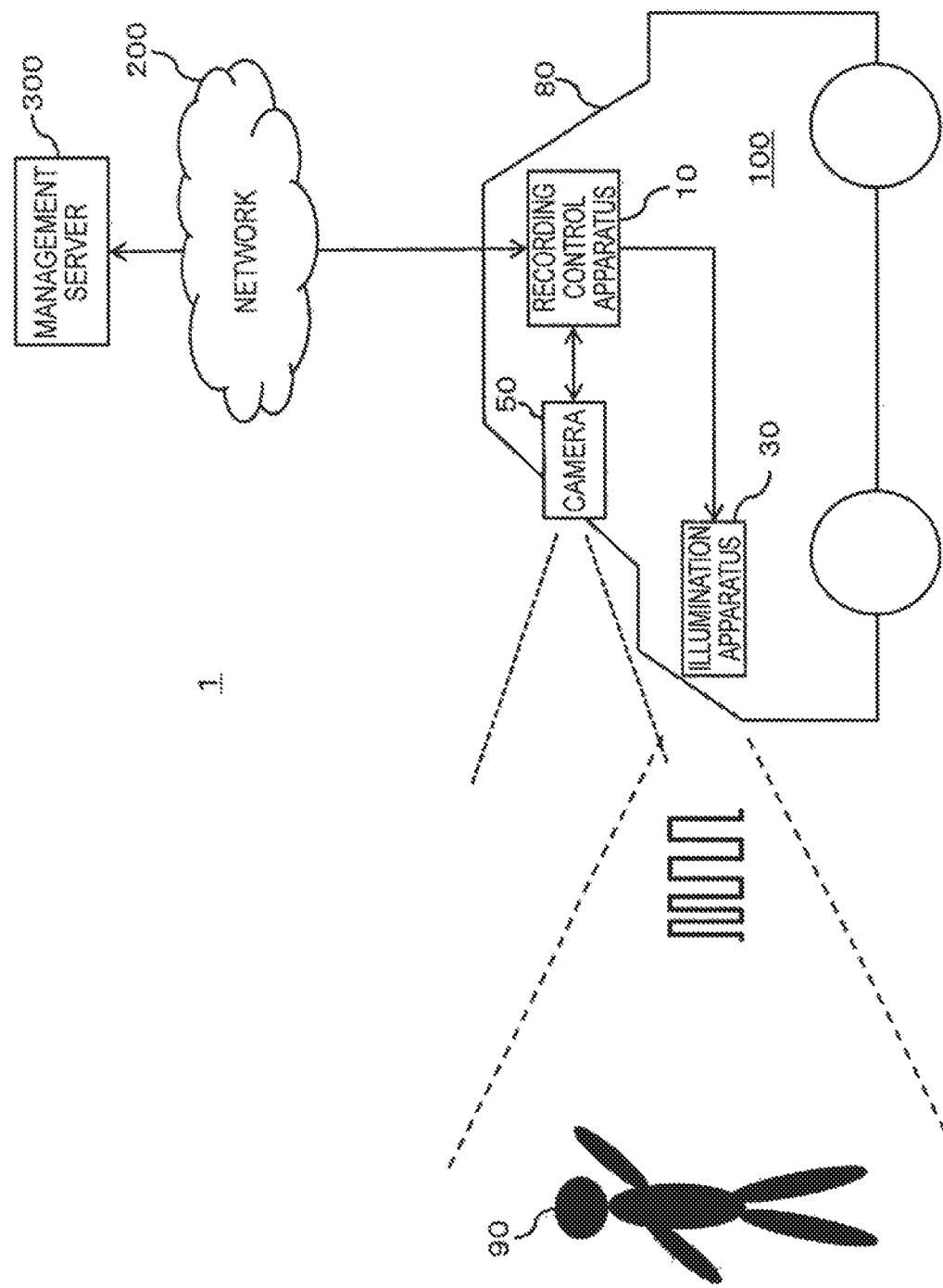
FIG. 1 is a diagram showing an example of a configuration of a video recording verification system according to the present disclosure.

A video recording verification system of the present disclosure is a system photographing an object to record video data and verifying whether the video data is falsified. FIG. 1 is a diagram showing a configuration of a video recording verification system according to a first embodiment of the present disclosure.

As shown in FIG. 1, a video recording verification system 1 is made up of a video recording apparatus 100 taking an image of an object 90 to generate video data, and a management server 300 verifying whether the video data generated by the video recording apparatus 100 is falsified. The video recording apparatus 100 and the management server 300 can exchange data through a network 200.

In this embodiment, the video recording apparatus 100 is mounted on a vehicle 80. The video recording apparatus 100 includes an illumination apparatus 30 applying an illumination light to the object 90 for illumination, a camera 50 imaging the object 90 to generate image data, and a recording control apparatus 10 controlling the illumination apparatus 30 and the camera 50.

The illumination apparatus 30 includes a light emitting element and a drive circuit driving the light emitting element. The illumination apparatus 30 outputs, for example, white light as the illumination light. If the camera 50 can take an image in the non-visible light region in addition to the visible light region, the illumination apparatus 30 may output non-visible light such as infrared light. The light emitting element is a light emitting element such as an LED controllable in blinking, luminance, and chromaticity at high speed. The illumination apparatus 30 generates and outputs the illumination light modulated in accordance with electronic authentication information etc. under the control of the recording control apparatus 10.

The camera 50 images the object at a predetermined frame rate to generate moving image data. The camera 50 includes an optical system such as a lens, an imaging element such as a CCD or CMOS image sensor converting optical information into an electric signal, and an AD converter converting an analog image signal from the imaging element into a digital signal and generating image data. The camera 50 can take an image in the visible light region.

If the camera 50 can take an image in the non-visible light region in addition to the visible light region, the illumination apparatus 30 may apply non-visible light such as infrared light.

Figure 2:
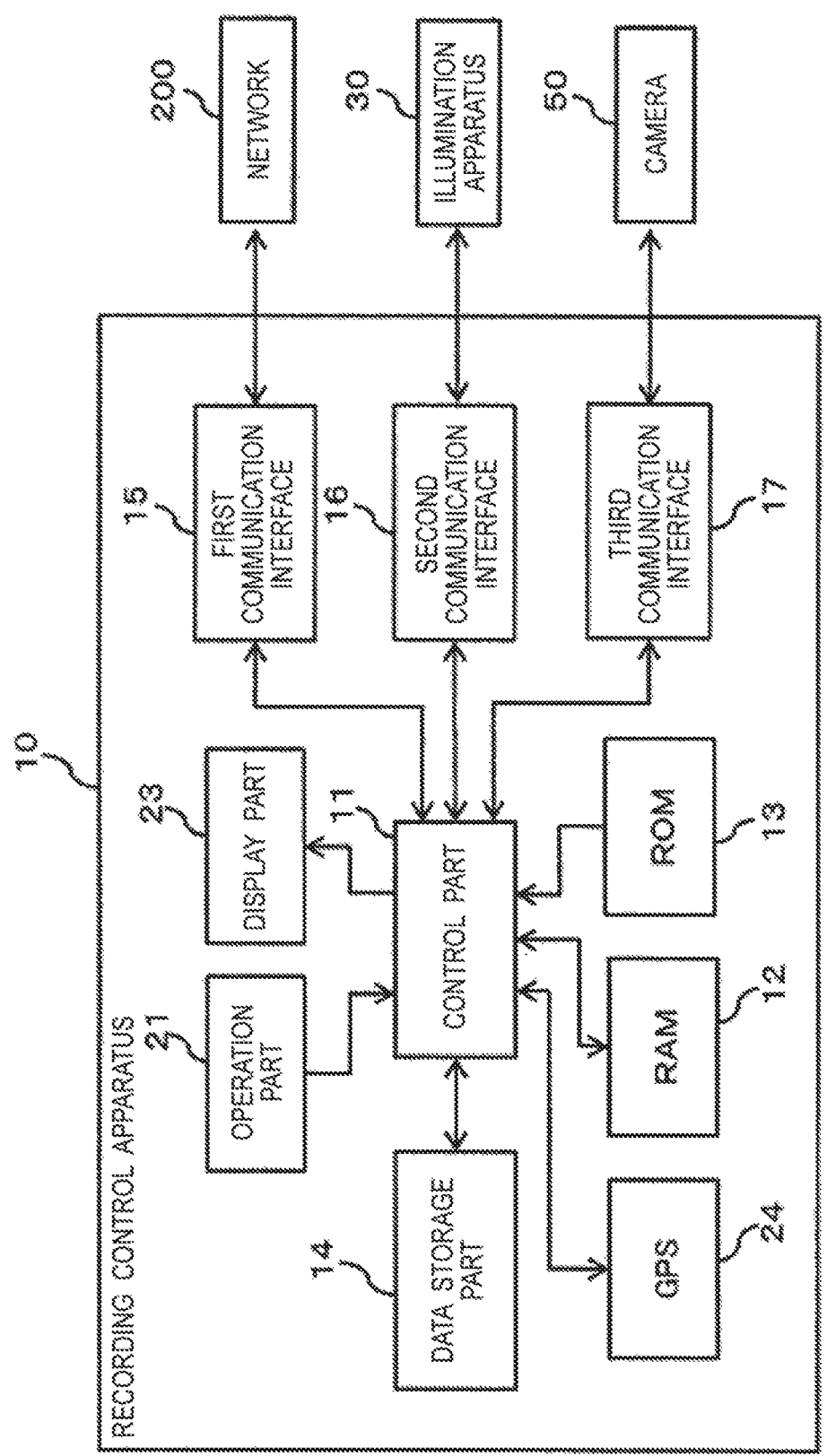
FIG. 2 is a block diagram showing a configuration of a recording control apparatus in the video recording verification system.

FIG. 2 is a block diagram showing a configuration of the recording control apparatus 10 in the video recording apparatus 100. As shown in FIG. 2, the recording control apparatus 10 includes a control part 11 executing a predetermined program to implement a predetermined function. The control part 11 is a general-purpose processor such as a CPU or MPU. The control part 11 may use a processor designed exclusively for implementing a predetermined function. Specifically, the control part 11 can include various processors such as a CPU, MPU, GPU, DSP, FPGA, and ASIC.

The recording control apparatus 10 further includes a RAM 12, a ROM 13, and a data storage part 14. The RAM 12 is a memory temporarily storing information and programs helpful for the control part 11 to perform calculations and is a work area appropriately accessed from the control part 11. The ROM 13 is a memory storing a program executed by the control part 11. The program executed by the control part 11 may be downloaded from a server through a communication line or may be provided via a recording medium such as an optical disk or a memory card to the recording control apparatus 10.

The data storage part 14 is a recording medium recording various pieces of information referred to in the control of the recording control apparatus 10. The data storage part 14 can be made up of a hard disk (HDD), a solid-state drive (SSD), or an optical disk apparatus, for example.

The recording control apparatus 10 further includes first to third communication interfaces 15 to 17. The first communication interface 15 is a communication circuit or a communication module for connecting to a network 200 such as the Internet to exchange data. The second communication interface 16 is a communication circuit or a communication module for exchanging data with the illumination apparatus 30. The third communication interface 17 is a communication circuit or a communication module for exchanging data with the camera 50. The first to third communication interfaces 15 to 17 perform communications in accordance with any communication standards such as USB, HDMI (registered trademark), Wi-Fi, and LAN.

The recording control apparatus 10 further includes an operation part 21 and a display part 23. The operation part 21 includes a keyboard, a mouse, and operation buttons. The operation buttons include buttons physically disposed on a main body of the recording control apparatus 10 and virtual buttons implemented by the display part 23 and a touch panel function. The display part 23 is made up of a liquid crystal display or an organic EL display, for example.

The recording control apparatus 10 further includes a GPS module 24 for acquiring position information. The GPS module 24 is a circuit receiving radio waves from positioning satellites, identifying the position of the recording control apparatus 10, and outputting information indicative of the position.

Figure 3:
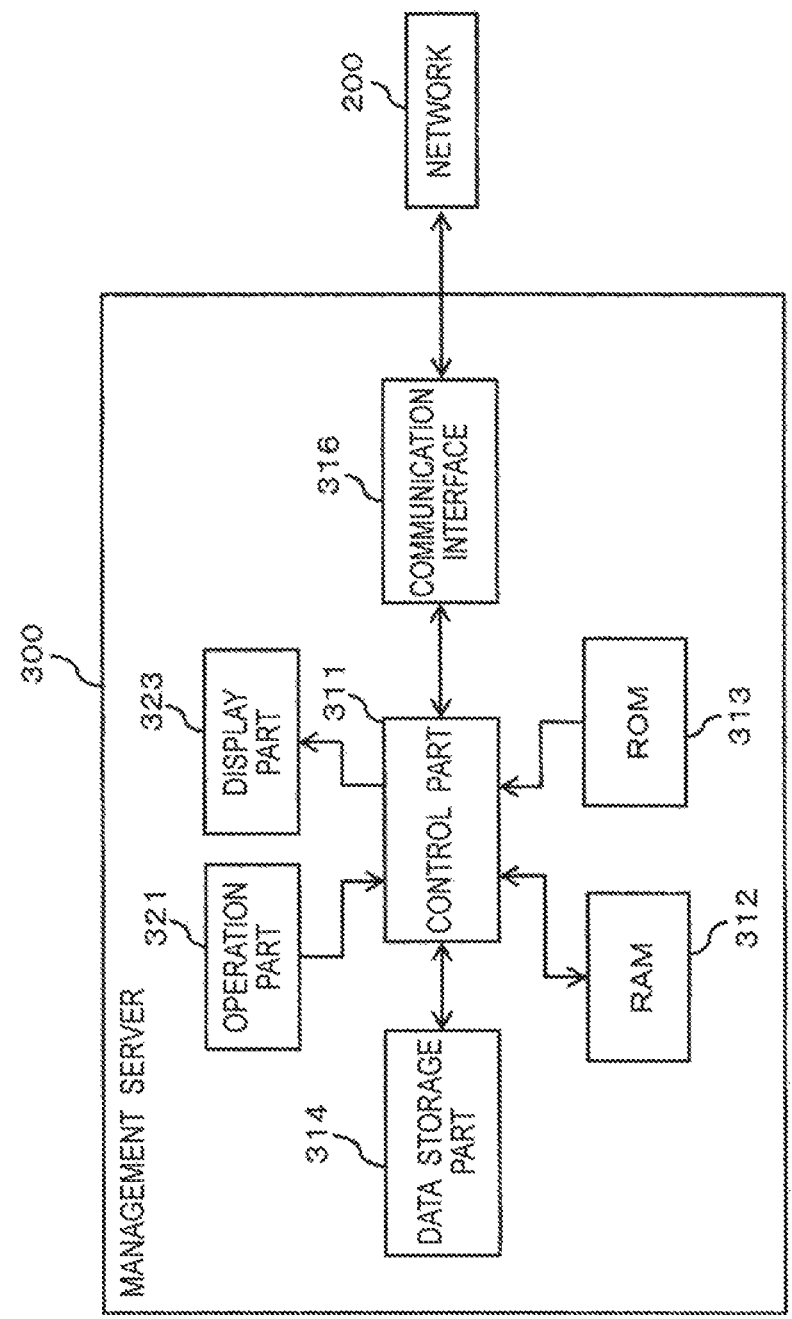
FIG. 3 is a block diagram showing a configuration of a management server in the video recording verification system.

FIG. 3 is a block diagram showing a configuration of the management server 300 in the video recording verification system 1. As shown in FIG. 3, the management server 300 includes a control part 311 executing a predetermined program to implement a predetermined function. The control part 311 is a general-purpose processor such as a CPU or MPU. The control part 311 may use a processor designed exclusively for implementing a predetermined function.

Specifically, the control part 311 can include various processors such as a CPU, MPU, GPU, DSP, FPGA, and ASIC.

The management server 300 further includes a RAM 312, a ROM 313, and a data storage part 314. The RAM 312 is a memory temporarily storing information and programs helpful for the control part 311 to perform calculations and is a work area appropriately accessed from the control part 311. The ROM 313 is a memory storing a program executed by the control part 311. The program executed by the control part 311 may be downloaded from a server through a communication line or may be provided via a recording medium such as an optical disk or a memory card to the management server 300.

The data storage part 314 is a recording medium recording various pieces of information referred to in the control of the management server 300. The data storage part 314 can be made up of a hard disk (HDD), a solid-state drive (SSD), or an optical disk apparatus, for example.

The management server 300 further includes a communication interface 316 that is a communication circuit or a communication module for connecting to the network 200 to exchange data. The communication interface 316 performs communications in accordance with a communication standard such as Wi-Fi or LAN.

The management server 300 further includes an operation part 321 and a display part 323. The operation part 321 includes a keyboard, a mouse, and operation buttons. The operation buttons include buttons physically disposed on a main body of the management server 300 and virtual buttons implemented by the display part 323 and a touch panel function. The display part 323 is made up of a liquid crystal display or an organic EL display, for example.

The video recording verification system 1 is an example of a video recording verification system. The video recording apparatus 100 is an example of a video recording apparatus. The management server 300 is an example of a verification apparatus. The camera 50 is an example of an imaging apparatus. An encryption key is an example of encryption information. The recording control apparatus 10 is an example of a control apparatus. The illumination apparatus 30 is an example of an illumination apparatus. The data storage parts 14, 314 are examples of a storage apparatus.

[1-2. Operation]

An operation of the video recording verification system 1 configured as described above will hereinafter be described.

Figure 4:
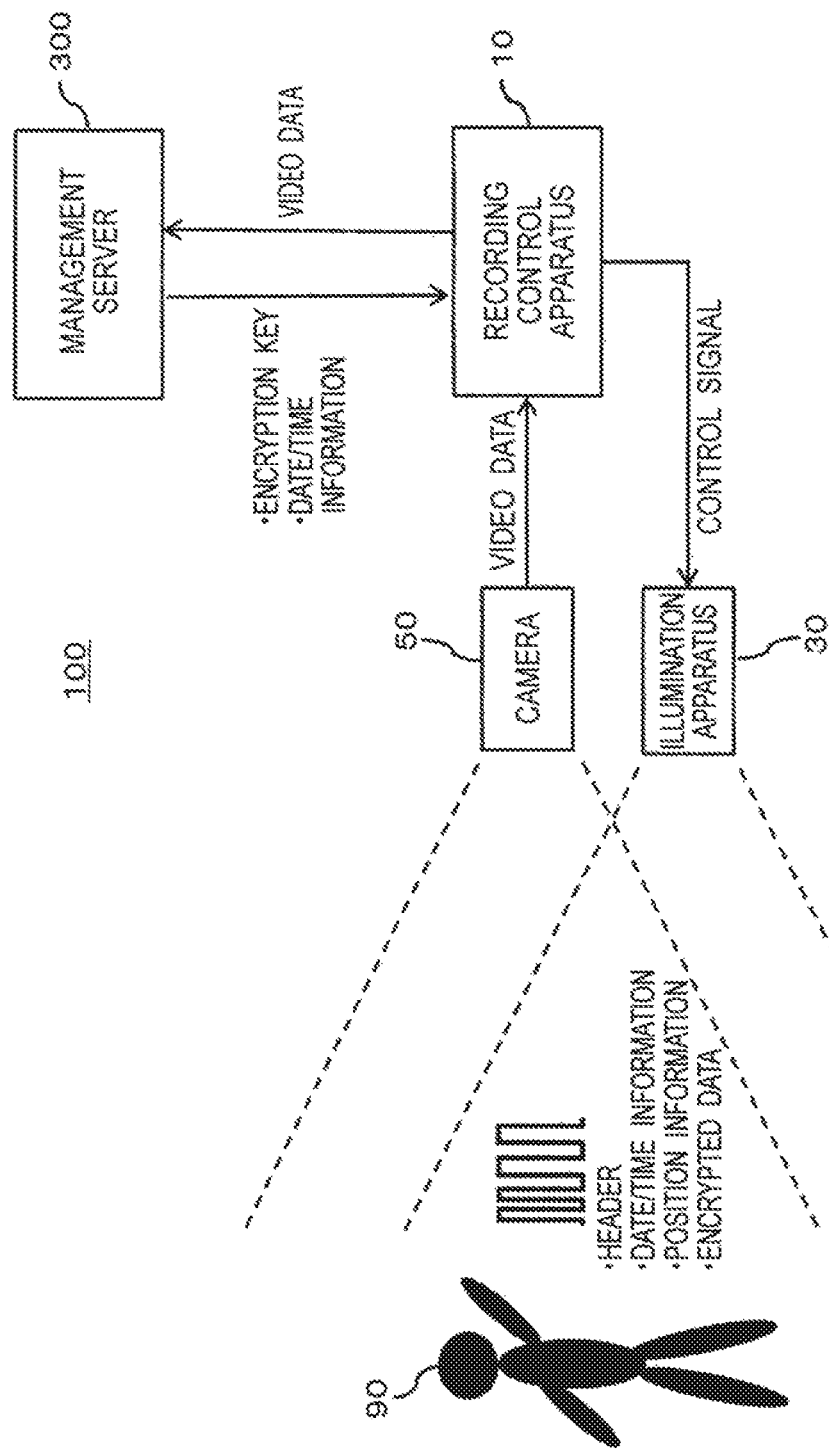
FIG. 4 is a diagram for explaining an operation of the video recording verification system according to a first embodiment.

FIG. 4 is a diagram for explaining the operation of the video recording verification system 1 in this embodiment. The video recording verification system 1 photographs the object 90 to generate video data and also records in the video data an encryption key serving as electronic authentication information indicative of the validity of the video data and additional information indicative of the photographing date/time and the position of the video data at the same time. The electronic authentication information includes encrypted data. The additional information includes date/time information indicative of the date/time of photographing of the video data and position information indicative of the position at the time of photographing of the video data. After photographing of the video data, the management server 300 can determine whether the video data is falsified after the photographing by analyzing the electronic authentication information recorded in the video data.

Particularly in this embodiment, to record the electronic authentication information and the additional information in the video data, the illumination apparatus 30 applies illumination light modulated by the electronic authentication information and the additional information. Specifically, the illumination light is blinked based on the electronic authentication information and the additional information, or the luminance and/or hue of the illumination light is changed based on the electronic authentication information and the additional information.

FIG. 5 is a diagram showing a sequence of the electronic authentication information and the additional information added to the illumination light output from the illumination apparatus 30. The example of FIG. 5 shows an example in which the electronic authentication information etc. is added to the illumination light by blinking (pulse modulation) of the illumination light. In FIG. 5, the horizontal axis is a time axis. A header, date/time information, position information, and encrypted data are added to the illumination light.

The "header" is information having a predetermined pattern and defining a write start position of the electronic authentication information etc. The date/time information, the position information, and the encrypted data are recorded at a position following the header in the video data. Based on the position of the header in the video data, a position (frame position) of the immediately preceding video data used for creating the encrypted data is determined.

The "date/time information" is information indicative of the date/time of generation of the video data. An encryption key used at the time of determination on whether falsification is made is identified based on the date and time indicated by the "date/time information". The date and time of generation of the encryption key in the management server 300 is substantially close to the date and time of generation of the video data, and therefore, in this embodiment, the date and time of generation of the encryption key in the management server 300 are handled as the date and time of generation of the video data.

The "position information" is position information indicative of the position of photographing of the video data. In this embodiment, the position of the recording control apparatus 10 is used as the position of photographing of the video data. This position information is acquired from the GPS module 24 of the recording control apparatus 10.

The "encrypted data" is data generated by using the immediately preceding video data and the encryption key. For example, the encrypted data is generated by reversibly or irreversibly encrypting the immediately preceding video data with the encryption key.

A "calculation buffer time" is a time for generating the encrypted data from the immediately preceding video data and the encryption key. The encrypted data (or first encrypted data) is added to the illumination light with a delay of the calculation buffer time after the date/time information.

FIG. 6 is a diagram showing another example of the information embedded in the illumination light. In the example of FIG. 6, date/time information, first encrypted data, and second encrypted data are arranged following a header. The header and the date/time information are the same as those described in FIG. 5.

The "first encrypted data" is encrypted data generated by using the immediately preceding video data and the encryption key. Therefore, the "first encrypted data" is the same as the encrypted data shown in FIG. 5.

The "second encrypted data" is encrypted data generated by using the position information and the encryption key. In the example of FIG. 6, the second encrypted data is data generated by encrypting the position information.

FIGS. 7A to 7D are flowcharts of a video recording operation in the video recording verification system 1 in this embodiment. The video recording operation in the video recording verification system 1 will hereinafter be described with reference to FIGS. 4 and 7A to 7D. In the video recording verification system 1, a control sequence shown in FIGS. 7A to 7D is repeatedly executed in a predetermined period.

As shown in FIG. 4, in a video data recording operation, the recording control apparatus 10 periodically receives the encryption key and the date/time information from the management server 300 and generates the encrypted data by using these pieces of information. Additionally, the recording control apparatus 10 applies the illumination light modulated based on the generated encrypted data etc. to the object 90 to image the object 90 and records the obtained video data.

Figure 7A:
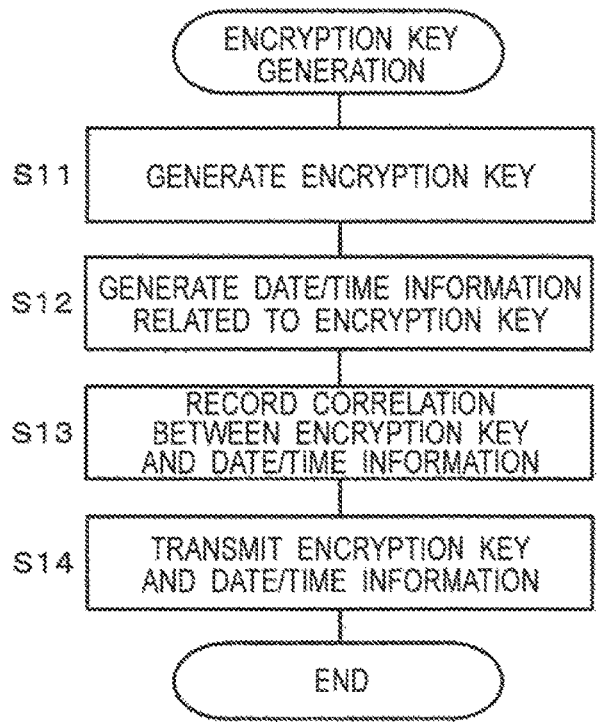
FIG. 7A is a flowchart showing an encryption generation process in the video recording verification system according to the first embodiment.

More specifically, as shown in FIG. 7A, the management server 300 generates the encryption key changing based on the date and time of creation (S11). The encryption key is information used for generating the encrypted data and is a hash function such as SHA-256, for example. The encryption key is generated every predetermined time, for example, every 10 seconds or every 10 minutes. In this embodiment, it is assumed that the encryption key is generated every 10 seconds. The date/time information is information indicative of the date and time of generation of the encryption key (e.g., a hash function).

The management server 300 then generates the date/time information indicative of the date and time of creation of the encryption key (S12). Instead of generating the date/time information, the date/time information may be included in the encryption key. For the date/time information, information accuracy can be set depending on beneficial information accuracy, usable data size, etc.

The management server 300 then correlates and stores the generated encryption key with the generated date/time information in the data storage part 314 as correlation information (S13). In this case, the data storage part 314 may be subjected to encryption so as to prevent leakage of the encryption key.

Subsequently, the management server 300 transmits the encryption key and the date/time information through the network 200 to the recording control apparatus 10 (S14). In this case, the encryption key itself may be encrypted and transmitted so as to prevent leakage of the encryption key.

Figure 7B:
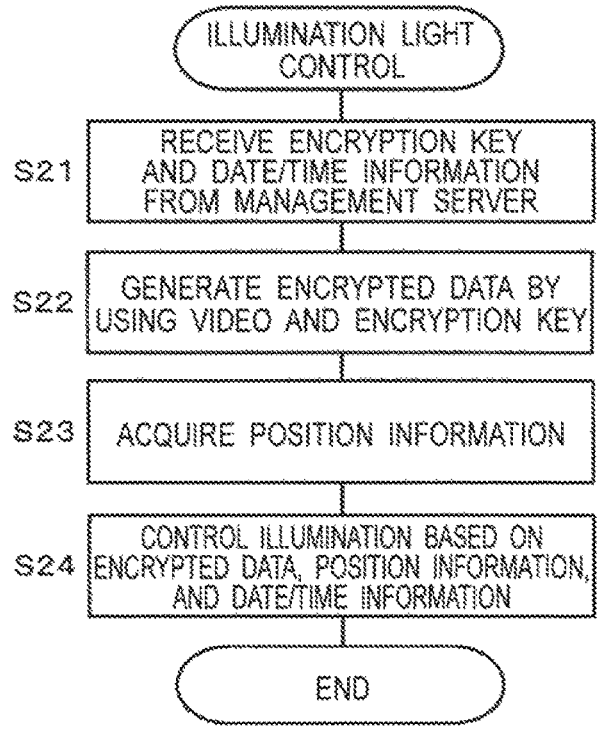
FIG. 7B is a flowchart showing an illumination light control process in the video recording verification system according to the first embodiment.

The recording control apparatus 10 controls the illumination light of the illumination apparatus 30 by using the encryption key and the date/time information received from the management server 300. FIG. 7B is a flowchart showing an illumination light control operation by the recording control apparatus 10.

As shown in FIG. 7B, the recording control apparatus 10 receives the encryption key and the date/time information from the management server 300 (S21) and then generates encrypted data by using the received encryption key and data of all (or a portion) of one frame (or multiple frames) of video data imaged a predetermined time (e.g., 10 seconds) ago (S22). For example, the recording control apparatus 10 receives a hash function as the encryption key from the management server 300 and uses the received hash function to generate a hash value as the encrypted data from the video data imaged a predetermined time (e.g., 10 seconds) ago.

The recording control apparatus 10 acquires the position information from the GPS module 24 (S23). Instead of the GPS module 24, various communication radio waves (such as radio waves from mobile phone base stations, beacons, Wi-Fi, and Bluetooth (registered trademark)), the Internet (position acquisition from an IP address), etc. are usable for a method of acquiring the position information.

The recording control apparatus 10 controls the illumination apparatus 30 so as to apply the illumination light modulated by the header, the received date/time information, the acquired position information, and the generated encrypted data is applied in the format shown in FIG. 5 (S24). As a result, the header, the received date/time information, the acquired position information, and the generated encrypted data are added to the illumination light. By photographing the object illuminated with such illumination light, video data is generated with the header, received date/time information, acquired position information, and generated encrypted data recorded (embedded) therein. To reliably record the information such as the encryption key in the video data, the control may be provided such that the same information is repeatedly output for a certain time. Additionally, to increase the number of times of repeated output and reliably record the information, the data size of the date/time information etc. may be reduced.

The acquired position information may be encrypted by using the encryption key to generate the second encrypted data. In this case, the illumination apparatus 30 is controlled to apply the illumination light added with the header, the date/time information, the first encrypted data (the video data encrypted by using the encryption key), and the second encrypted data in the format shown in FIG. 6.

The illumination light of the illumination apparatus 30 is controlled as described above, so that the object 90 is illuminated with the illumination light added with the encrypted data (electronic authentication information) etc. The object 90 illuminated in this way is imaged by the camera 50, and the encrypted data serving as the electronic authentication information and the additional information are recorded in the generated video data (moving image data).

Figure 7C:
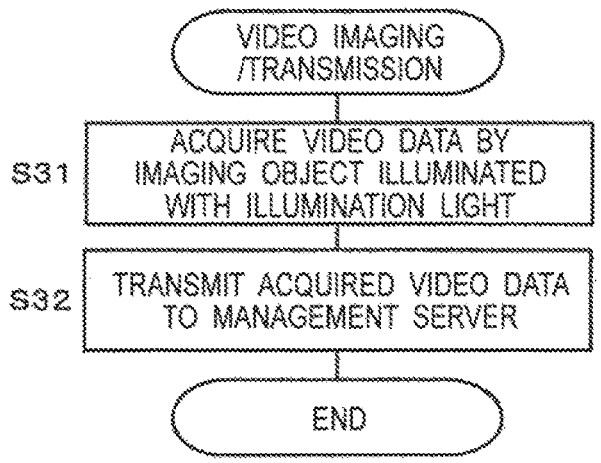
FIG. 7C is a flowchart showing a video imaging/transmission process in the video recording verification system according to the first embodiment.

FIG. 7C is a flowchart showing a process of the recording control apparatus 10 for video data obtained by photographing the object 90. As shown in FIG. 7C, the recording control apparatus 10 acquires the video data (moving image data) obtained by imaging from the camera 50 (S31). The recording control apparatus 10 records the acquired video data in the data storage part 14. In this step, to record multiple bits of information in one frame, the date may be recorded such that a screen is time-divided in each frame. An amount of recorded information may be increased by increasing the number of frames per unit time. The same information may repeatedly be recorded in different frames so that data loss can be complemented.

While acquiring the video data from the camera 50 (i.e., photographing the video data), the recording control apparatus 10 transmits the acquired video data through the network 200 to the management server 300 (S32). The recording control apparatus 10 may transmit the video data recorded in the data storage part 14 through the network 200 to the management server 300 after the photographing of the video data is completed, i.e., after the video data is once recorded in the data storage part 14.

Figure 7D:
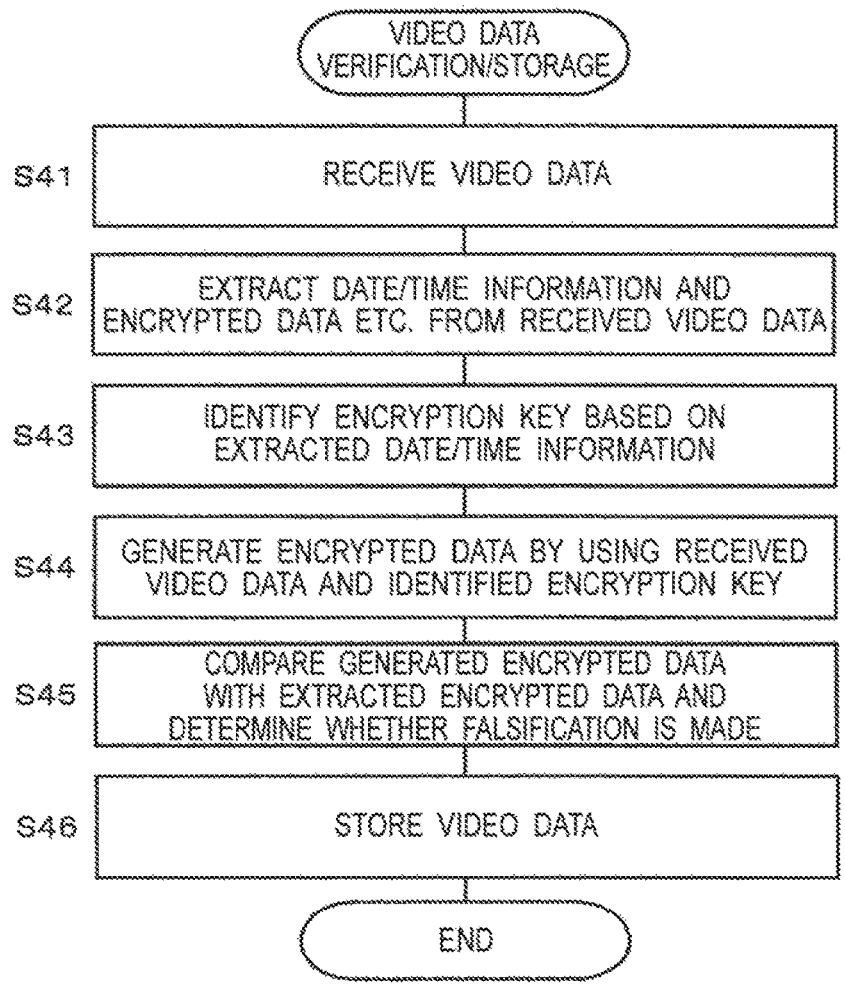
FIG. 7D is a flowchart showing a video data verification/storage process in the video recording verification system according to the first embodiment.

The management server 300 determines whether the video data received from the recording control apparatus 10 of the video recording apparatus 100 is falsified and then stores the video data in the data storage part 314. FIG. 7D is a flowchart showing a process of the management server 300 in this case.

As shown in FIG. 7D, the management server 300 receives the video data (S41) and then analyzes the received video data to extract the header, the date/time information, the encrypted data, etc. from the video data (S42). The management server 300 refers to the correlation information and identifies the encryption key correlated with the date/time information based on the extracted date/time information (S43). The management server 300 generates encrypted data by using the received video data and the identified encryption key (S44). The frame of the video data used for generating the encrypted data is identified based on the header extracted from the video data. For example, a frame at a predetermined time (e.g., 10 seconds) before a position of a first frame constituting the header is identified as the frame used for generating the encrypted data.

The management server 300 compares the generated encrypted data with the encrypted data extracted from the video data and determines whether falsification is made (S45). If both data are not identical, it is determined that the video data is falsified. The management server 300 stores the video data in the data storage part 314 together with the determination of falsification. The extracted position information and date/time information may be added to the video data and stored as an index. To prevent leakage of the video data, the video data may be encrypted in the data storage part 314 of the management server 300.

According to the above configuration, the electronic authentication information and the additional information can efficiently be embedded in video data when the video data is generated. Additionally, since the electronic authentication information and the additional information are optically embedded in the video data, these pieces of information can be extracted from only the video data.

[1-3. Effects Etc.]

As described above, the video recording apparatus 100 according to this embodiment includes the illumination apparatus 30 applying a modulated illumination light, the recording control apparatus 10 controlling the illumination apparatus 30, the camera 50 imaging the illumination light and an object at the same time to generate video data, and the data storage parts 14, 314 storing the video data generated by the camera 50. The recording control apparatus 10 generates encrypted data by using at least a portion of the video data imaged by the camera 50 and the encryption key (encryption information) generated as information changing in accordance with a date and time and used for encryption and controls the illumination apparatus 30 such that the illumination light is modulated by the generated encrypted data.

According to the video recording apparatus 100 of this embodiment, since the video data is obtained by the camera 50 photographing the object illuminated with the illumination light modulated by the encrypted data, the encrypted data is included in the video data. Therefore, the encrypted data can be embedded in the video data at the time of generation (photographing) of the video data, and whether falsification is made from the time of generation of the video data can be determined by reference to the embedded encrypted data. Since the electronic authentication information is embedded in the video data, new electronic authentication information may not be added even if a portion of the video data is cut out.

Regarding the illumination light, the illumination light can further be modulated based on the date/time information indicative of the photographing date/time of the video data and the position information indicative of the photographing position of the video data, the date/time information and the position information can be embedded together with the encrypted data in the video data.

Also, the management server 300 receives the video data from the video recording apparatus 100 (S41), extracts the date/time information indicative of a date and time and the encrypted data from the received video data (S42), identifies the encryption key (encryption information) based on the extracted date/time information (S43), generates encrypted data from the identified encryption key and at least a portion of the received video data (S44), and determines whether falsification is made by comparing the generated encrypted data with the extracted encrypted data (S45). Whether the video data is falsified can be determined from the encrypted data embedded in the video data in this way.

This embodiment also discloses a video recording method for recording a video of an object by using the video recording apparatus 100. The video recording method includes a step of generating an encryption key changed in accordance with a date and time as information used for encryption, a step of generating encrypted data by using the encryption key, a step of generating an illumination light modulated based on the encrypted data, a step of imaging the illumination light and the object at the same time to generate video data, and a step of storing the video data generated by an imaging apparatus in a recording medium. In the step of generating encrypted data, the encrypted data is generated by using at least a portion of the video data imaged by the imaging apparatus and the encryption key.

This embodiment also discloses a video verification method for verifying whether video data recorded by the video recording method described above is falsified. The video verification method includes a step of receiving video data from a video recording apparatus, a step of extracting date/time information indicative of a date and time and the encrypted data from the received video data, a step of identifying an encryption key based on the extracted date/time information, a step of generating encrypted data from the identified encryption key and at least a portion of the received video data, and a step of determining whether falsification is made by comparing the generated encrypted data with the extracted encrypted data.

Second Embodiment

A configuration described in this embodiment can reduce an amount of data communication between the recording control apparatus 10 and the management server 300 as compared to the first embodiment. The hardware configuration of the video recording verification system of this embodiment is the same as the first embodiment.

Figure 8:
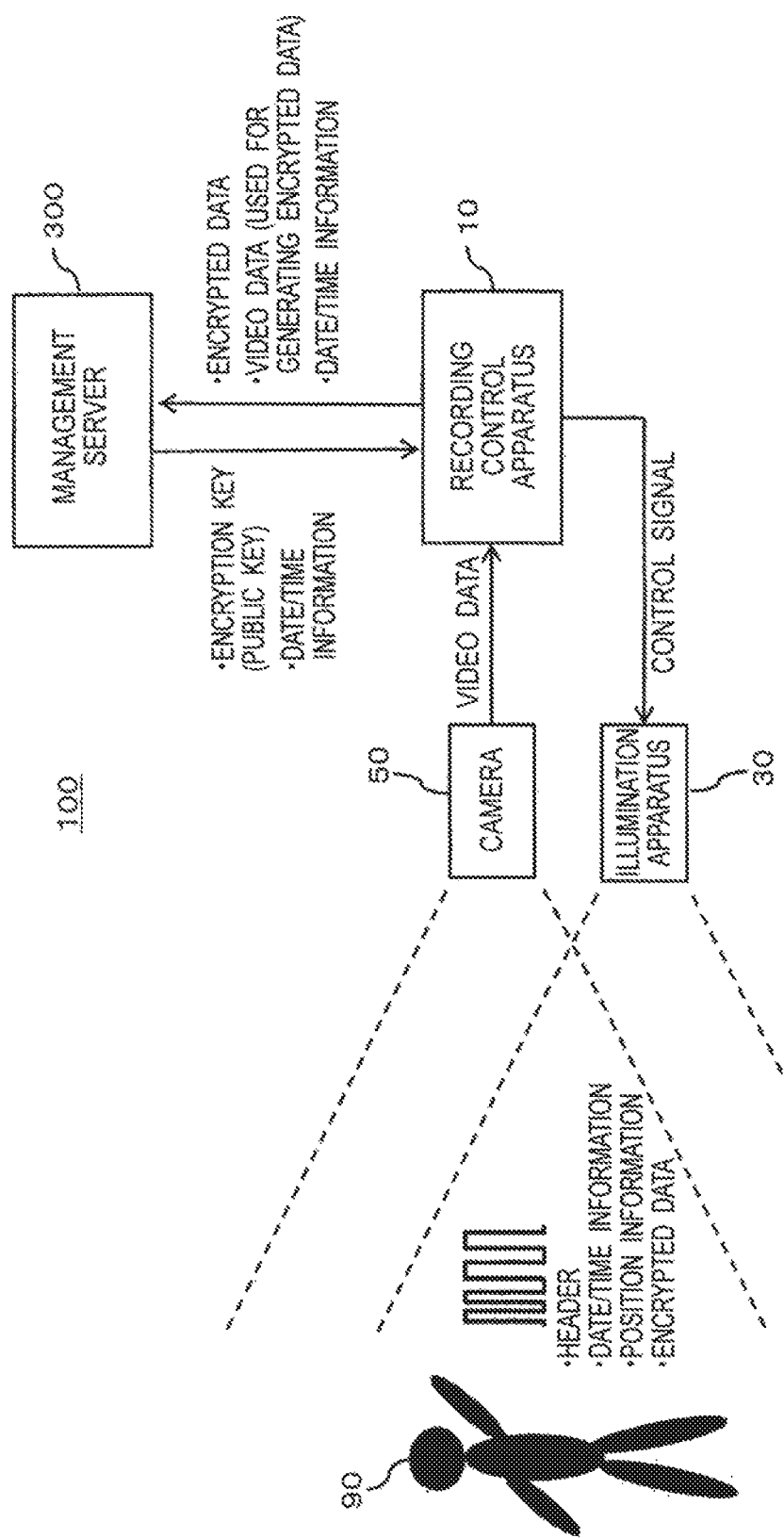
FIG. 8 is a diagram for explaining an operation of the video recording verification system according to a second embodiment.

FIG. 8 is a diagram for explaining an operation of the video recording verification system according to the second embodiment. In the first embodiment, the recording control apparatus 10 transmits the entire video data to the management server 300 for falsification verification. In contrast, in this embodiment, the recording control apparatus 10 transmits only the encrypted data, the video data related to the frame used for generating the encrypted data, and the date/time information, for falsification verification.

FIGS. 9A to 9D are flowcharts of a video recording operation in the video recording verification system 1 in this embodiment. The video recording operation in the video recording verification system 1 will hereinafter be described with reference to FIGS. 8 and 9A to 9D. In the video recording verification system 1, the processes shown in FIGS. 9A to 9D are repeatedly executed in a predetermined period.

In this embodiment, as shown in FIG. 8, the recording control apparatus 10 periodically receives a public key and date/time information from the management server 300 and generates encrypted data by using these pieces of information. Additionally, the recording control apparatus 10 applies the illumination light modulated based on the generated encrypted data etc. to the object 90 to image the object 90 and records the obtained video data.

Figure 9A:
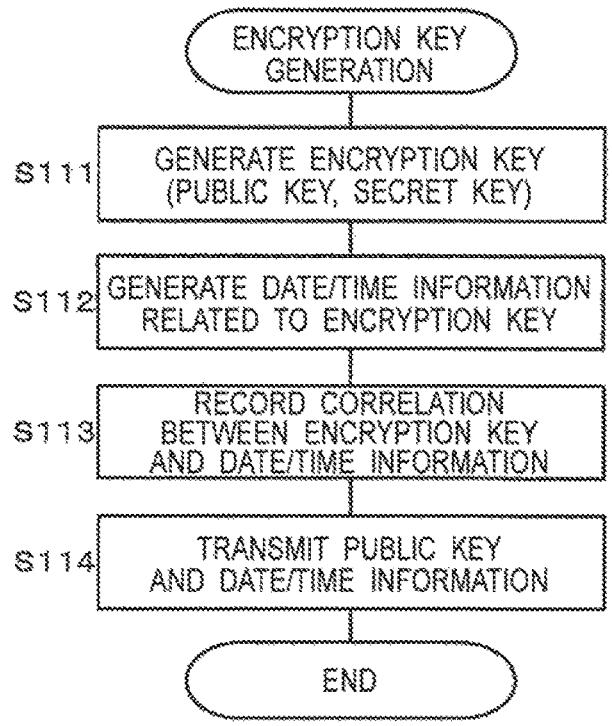
FIG. 9A is a flowchart showing an encryption generation process in the video recording verification system according to the second embodiment.

More specifically, as shown in FIG. 9A, the management server 300 generates a public key for generating encrypted data and a secret key for decrypting the encrypted data, as an encryption key changing based on the date and time of creation (S111). The public key and the secret key are obtained in accordance with the RSA encryption method, for example. In this embodiment, the encryption key is generated every predetermined time, for example, every 10 seconds or every 10 minutes. The date/time information is information indicative of the date and time of generation of the encryption key.

The management server 300 then generates the date/time information indicative of the date and time of creation of the public key and the secret key (S112). Instead of generating the date/time information, the date/time information may be included in the public key and the private key. For the date/time information, information accuracy can be set depending on beneficial information accuracy, usable data size, etc.

The management server 300 then correlates and stores the generated public and secret keys with the generated date/time information in the data storage part 314 as correlation information (S113). In this case, the data storage part 314 may be subjected to encryption so as to prevent leakage of the encryption key.

Subsequently, the management server 300 transmits the public key and the date/time information through the network 200 to the recording control apparatus 10 (S114). In this case, the public key itself may be encrypted and transmitted.

Figure 9B:
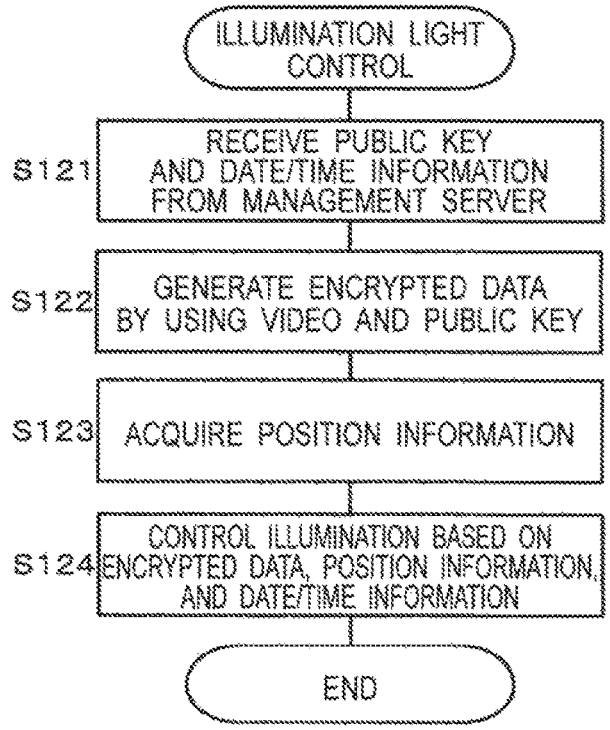
FIG. 9B is a flowchart showing an illumination light control process in the video recording verification system according to the second embodiment.

The recording control apparatus 10 controls the illumination light of the illumination apparatus 30 by using the public key and the date/time information received from the management server 300. FIG. 9B is a flowchart showing an illumination light control operation by the recording control apparatus 10.

As shown in FIG. 9B, the recording control apparatus 10 receives the public key and the date/time information from the management server 300 (S121) and then generates encrypted data by using the received public key and data of all (or a portion) of one frame (or multiple frames) of video data imaged a predetermined time (e.g., 10 seconds) ago (S122). Specifically, the recording control apparatus 10 uses the received public key to encrypt all (or a portion) of one frame (or multiple frames) of video data imaged a predetermined time (e.g., 10 seconds) ago and thereby generates the encrypted data.

The recording control apparatus 10 acquires the position information from the GPS module 24 (S123). The recording control apparatus 10 controls the illumination apparatus 30 so as to apply the illumination light added with the header, the received date/time information, the acquired position information, and the generated encrypted data in the format shown in FIG. 5 (S124). To reliably record the information such as the encryption key in the video data, the control may be provided such that the same information is repeatedly output for a certain time. Additionally, to increase the number of times of repeated output and reliably record the information, the data size of the date/time information etc. may be reduced.

The acquired position information may be encrypted by using the public key to generate the second encrypted data. In this case, the illumination apparatus 30 is controlled to apply the illumination light added with the header, the date/time information, the first encrypted data (the video data encrypted by using the public key), and the second encrypted data in the format shown in FIG. 6.

The illumination light of the illumination apparatus 30 is controlled as described above, so that the object 90 is illuminated with the illumination light added with the encrypted data (electronic authentication information) etc. The object 90 illuminated in this way is imaged by the camera 50, and the video data (moving image data) is generated. In this video data, the encrypted data and the additional information are recorded as optical information (luminance change, chromaticity change, etc.).

Figure 9C:
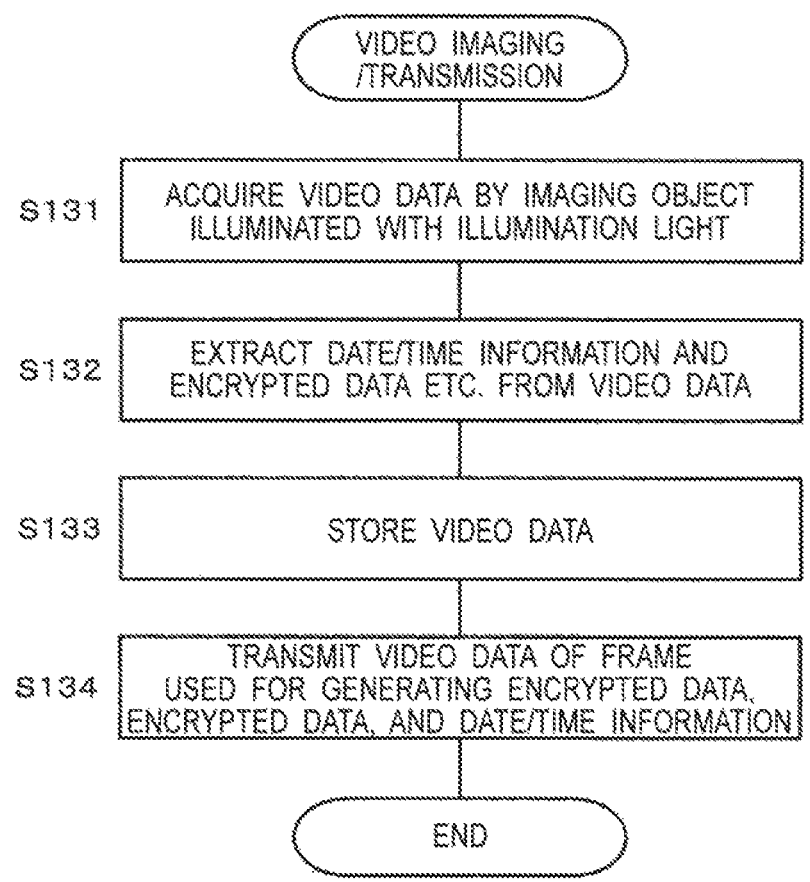
FIG. 9C is a flowchart showing a video imaging/transmission process in the video recording verification system according to the second embodiment.

FIG. 9C is a flowchart showing a process of acquiring video data obtained by photographing the object 90 illuminated as described above in the recording control apparatus 10.

As shown in FIG. 9C, the recording control apparatus 10 acquires video data (moving image data) obtained by imaging from the camera 50 (S131). To record multiple bits of information in one frame, the recording control apparatus 10 may record data such that a screen is time-divided in one frame. An amount of recorded information may be increased by increasing the number of frames per unit time. The same information may repeatedly be recorded in different frames so that data loss can be complemented.

The recording control apparatus 10 extracts the header, the date/time information, the position information, and the encrypted data from the acquired video data (S132). Subsequently, the recording control apparatus 10 sequentially stores the acquired video data in the data storage part 14 while acquiring the video data (S133).

The recording control apparatus 10 transmits the extracted encrypted data, a portion of the video data used for generating the encrypted data, and the extracted date/time information to the management server 300 (S134). The portion (one or more frames) of the video data used for generating the encrypted data can be identified based on the position of the extracted header. For example, a frame at a predetermined time (e.g., 10 seconds) before a position of a first frame constituting the extracted header can be identified as the frame used for generating the encrypted data.

Figure 9D:
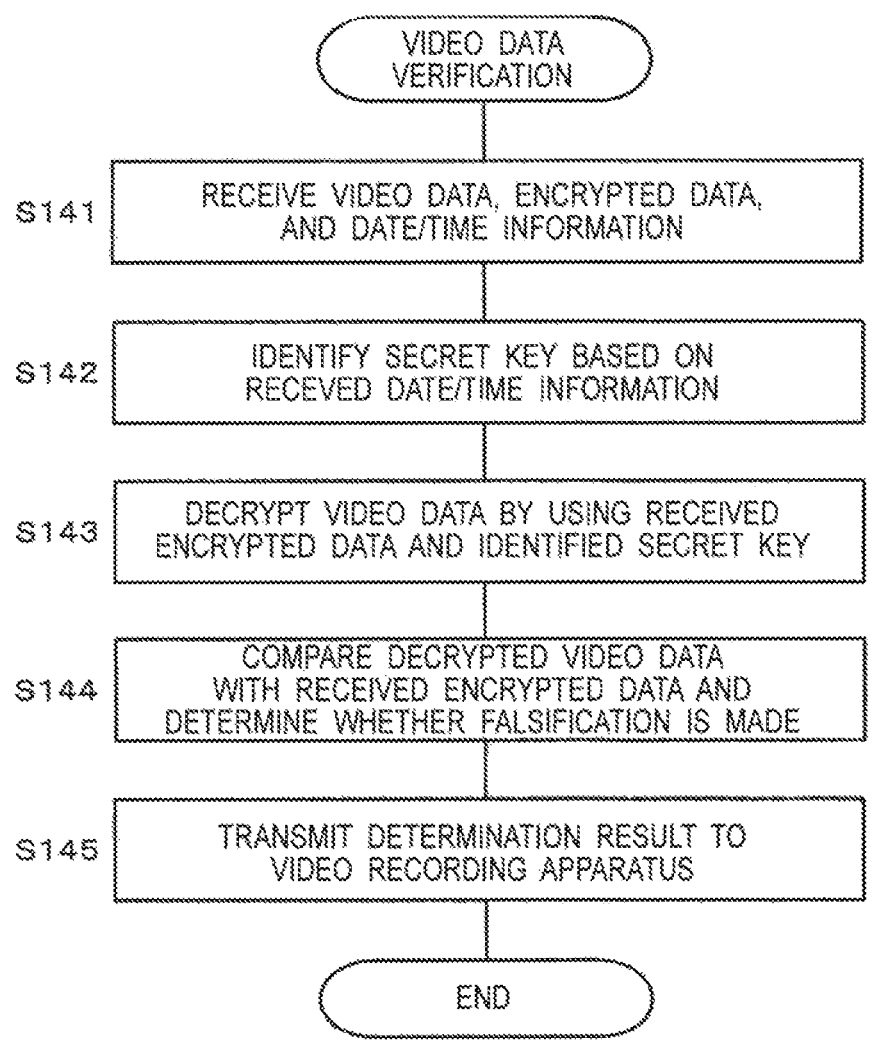
FIG. 9D is a flowchart showing video data verification/storage process in the video recording verification system according to the second embodiment.

The management server 300 determines whether the video data recorded by the video recording apparatus 100 is falsified, based on the data received from the recording control apparatus 10 of the video recording apparatus 100. FIG. 9D is a flowchart showing a process of the management server 300 in this case.

As shown in FIG. 9D, the management server 300 receives the video data, the encrypted data, and the date/time information (S141) and then identifies the secret key by reference to the correlation information based on the received date/time information (S142). The management server 300 decrypts the video data by using the received encrypted data and the identified secret key (S143).

The management server 300 compares the received video data with the decrypted video data and determines whether falsification is made (S144). If both data are not identical, it is determined that the video data is falsified. The management server 300 transmits a falsification determination result to the recording control apparatus 10 of the video recording apparatus 100 (S145).

The recording control apparatus 10 may display the received determination result on the display part 23 or may add the determination result to the index of the video data.

As described above, the management server 300 of this embodiment receives the encrypted data included in the video data, the portion of the video data used for generating the encrypted data, and the date/time information indicative of the date and time related to the encrypted data from the video recording apparatus 100 (S141). The management server 300 identifies the secret key based on the received date/time information (S142) and decrypts the encrypted data with the identified secret key to obtain the video data (S143). The management server 300 then determines whether falsification is made by comparing the video data obtained through decryption with the received portion of the video data (S144). Whether the video data is falsified can also be determined with the verification method as described above.

In the example described above, the encrypted data included in the video data, the portion of the video data used for generating the encrypted data, and the date/time information indicative of the date and time related to the encrypted data are transmitted from the recording control apparatus 10 to the management server 300. Instead of these pieces of information, a first portion of the video data having the encrypted data recorded therein, a second portion of the video data used for generating the encrypted data, and the date/time information indicative of the date and time related to the encrypted data may be transmitted from the recording control apparatus 10 to the management server 300. In this case, the management server 300 extracts the encrypted data from the received first portion of the video data. Additionally, the management server 300 identifies the secret key from the correlation information based on the received date/time information. The management server 300 may decrypt the extracted encrypted data with the identified secret key to obtain the video data and may determine whether falsification is made by comparing the video data obtained through decryption with the received second portion of the video data.

Other Embodiments

As described above, the first and second embodiments have been described as exemplifications of the techniques disclosed in this application. However, the techniques in the present disclosure are not limited thereto and are also applicable to embodiments in which modifications, replacements, additions, omissions, etc. are appropriately made. Additionally, the constituent elements described in the first and second embodiments can be combined to provide a new embodiment. Therefore, other embodiments will hereinafter be exemplified.

In the embodiments described above, the illumination light modulated based on electronic authentication information etc. is applied to the object 90 to take an image of the object; however, the modulated illumination light may directly be applied to the camera 50. In other words, the camera 50 may directly image the illumination light together with the object instead of imaging the illumination light reflected by the object 90.

In the embodiments described above, the illumination apparatus mounted on a vehicle is used as an example; however, the illumination apparatus is not limited thereto and may be a portable light. Alternatively, the illumination apparatus may be a fixed illumination such as a streetlight or a traffic light.

In the embodiments described above, the recording control apparatus 10 or the data storage part 14, 314 built in the management server 300 is described as an example of the storage part storing the video data; however, the storage part may be an apparatus independent of the recording control apparatus 10 or the management server 300.

Examples of the disclosed technique are as follows.

1st aspect: A first aspect of the present disclosure provides a video recording apparatus. The video recording apparatus includes an illumination apparatus applying a modulated illumination light; a control apparatus controlling the illumination apparatus; an imaging apparatus imaging the illumination light and an object at the same time to generate video data; and a storage apparatus storing the video data generated by the imaging apparatus. The control apparatus generates encrypted data by using at least a portion of the video data imaged by the imaging apparatus and encryption information generated as information changing in accordance with a date and time and used for encryption and controls the illumination apparatus such that the illumination light is modulated by the generated encrypted data.

2nd aspect: A second aspect of the present disclosure provides a video recording verification system including the video recording apparatus described above; and a verification apparatus generating the encryption information changing in accordance with a date and time and verifying whether video data recorded by the video recording apparatus is falsified.

3rd aspect: A third aspect of the present disclosure provides a video recording method for recording a video of an object by using a video recording apparatus. The video recording method includes the steps of generating encryption information changed in accordance with a date and time as information used for encryption; generating encrypted data by using the encryption information; generating an illumination light modulated based on the encrypted data; imaging the illumination light and the object at the same time to generate video data; and storing the video data generated by an imaging apparatus in a recording medium. In the step of generating encrypted data, the encrypted data is generated by using at least a portion of the video data imaged by the imaging apparatus and the encryption information.

4th aspect: A fourth aspect of the present disclosure provides a first video verification method for verifying whether video data recorded by the video recording method described above is falsified. The first video verification method includes the steps of receiving video data from the video recording apparatus; extracting date/time information indicative of a date and time and the encrypted data from the received video data; identifying encryption information based on the extracted date/time information; generating encrypted data from the identified encryption information and at least a portion of the received video data; and determining whether falsification is made by comparing the generated encrypted data with the extracted encrypted data.

5th aspect: A fifth aspect of the present disclosure provides a second video verification method for verifying whether video data recorded by the video recording method described above is falsified. The second video verification method includes the steps of receiving encrypted data included in video data, a portion of the video data used for generating the encrypted data, and date/time information indicative of a date and time related to the encrypted data from the video recording apparatus; identifying encryption information based on the received date/time information; decrypting the encrypted data with the identified encryption information to obtain video data; and determining whether falsification is made by comparing the video data obtained through decryption with the received portion of the video data.

6th aspect: A sixth aspect of the present disclosure provides a third video verification method for verifying whether video data recorded by the video recording method described above is falsified. The third video verification method includes the steps of:

receiving a first portion of video data having encrypted data recorded therein, a second portion of the video data used for generating the encrypted data, and date/time information indicative of a date and time related to the encrypted data from the video recording apparatus; extracting the encrypted data from the first portion of the video data; identifying encryption information based on the received date/time information; decrypting the extracted encrypted data with the identified encryption information to obtain video data; and determining whether falsification is made by comparing the video data obtained through decryption with the received second portion of the video data.

The embodiments have been described as exemplifications of the techniques in the present disclosure. The accompanying drawings and the detailed description have been provided for this purpose.

Therefore, the constituent elements described in the accompanying drawings and the detailed description may include not only the constituent elements essential for solving the problem but also constituent elements not essential for solving the problem so as to illustrate the techniques. Therefore, even though these non-essential constituent elements are included in the accompanying drawings and the detailed description, these non-essential constituent elements should not immediately be recognized as being essential.

Since the embodiment described above is intended to illustrate the techniques in the present disclosure, various modifications, replacements, additions, omissions, etc. can be made within the claims and the scope equivalent thereto.

Since electronic authentication information can be embedded in video data at the time of generation of the video data, the present disclosure is useful for a video recording apparatus recording a video desirable for verification of falsification.

What is claimed is:

1. A video recording verification system comprising:
a video recording apparatus, wherein the video recording apparatus comprises:
an illumination apparatus applying a modulated illumination light;
a control apparatus controlling the illumination apparatus;
an imaging apparatus imaging the illumination light and an object at the same time to generate video data; and
a storage apparatus storing the video data generated by the imaging apparatus, wherein
the control apparatus generates encrypted data, by using at least a portion of the video data imaged by the imaging apparatus and encryption information generated as information changing in accordance with a date and time and used for encryption, and
controls the illumination apparatus such that the illumination light is modulated by the generated encrypted data; and
a verification apparatus generating the encryption information changing in accordance with a date and time and verifying whether video data recorded by the video recording apparatus is falsified, wherein the verification apparatus:
receives video data from the video recording apparatus,
extracts date/time information indicative of a date and time and the encrypted data from the received video data,
identifies encryption information based on the extracted date/time information,
generates encrypted data from the identified encryption information and at least a portion of the received video data, and
determines whether falsification is made by comparing the generated encrypted data with the extracted encrypted data.

2. The video recording verification system according to claim 1, wherein
the control apparatus further controls the illumination apparatus such that the illumination light is modulated based on date/time information indicative of a photographing date and time of video data and position information indicative of a photographing position of video data.

3. The video recording verification system according to claim 1, wherein the encryption information is generated every predetermined time.

4. The video recording verification system according to claim 3, wherein the control apparatus controls the illumination apparatus such that the same encrypted data is repeatedly included in the illumination light a predetermined number of times.

5. The video recording verification system according to claim 1, wherein the encryption information is a hash function.

6. A video verification method for recording a video of an object by using a video recording apparatus and verifying whether video data recorded is falsified, the method comprising the steps of: generating encryption information changed in accordance with a date and time as information used for encryption; generating encrypted data by using the encryption information; generating an illumination light modulated based on the encrypted data; imaging the illumination light and the object at the same time to generate video data; and storing the video data generated by an imaging apparatus in a recording medium, wherein in the step of generating the encrypted data, the encrypted data is generated by using at least a portion of the video data imaged by the imaging apparatus and the encryption information; receiving video data from the video recording apparatus; extracting date/time information indicative of a date and time and the encrypted data from the received video data; identifying encryption information based on the extracted date/time information; generating encrypted data from the identified encryption information and at least a portion of the received video data; and determining whether falsification is made by comparing the generated encrypted data with the extracted encrypted data.

* * * * *